United States Patent
Yang

(10) Patent No.: US 9,872,124 B2
(45) Date of Patent: *Jan. 16, 2018

(54) MOBILITY MANAGEMENT METHOD AND SYSTEM IN M2M NETWORK

(71) Applicant: ZTE CORPORATION, Shenzhen, Guangdong Province (CN)

(72) Inventor: Kun Yang, Shenzhen (CN)

(73) Assignee: ZTE Corporation (CN)

( * ) Notice: Subject to any disclaimer, the term of this patent is extended or adjusted under 35 U.S.C. 154(b) by 94 days.

This patent is subject to a terminal disclaimer.

(21) Appl. No.: 14/648,062

(22) PCT Filed: Aug. 15, 2013

(86) PCT No.: PCT/CN2013/081572
§ 371 (c)(1),
(2) Date: May 28, 2015

(87) PCT Pub. No.: WO2013/189337
PCT Pub. Date: Dec. 27, 2013

(65) Prior Publication Data
US 2015/0304798 A1    Oct. 22, 2015

(30) Foreign Application Priority Data

Nov. 29, 2012    (CN) .......................... 2012 1 0498691

(51) Int. Cl.
*H04W 4/00*    (2009.01)
*H04W 8/10*    (2009.01)
(Continued)

(52) U.S. Cl.
CPC ............. *H04W 4/005* (2013.01); *H04W 8/02* (2013.01); *H04W 8/10* (2013.01); *H04W 8/20* (2013.01);
(Continued)

(58) Field of Classification Search
CPC ..... H04W 4/005; H04W 60/06; H04W 76/06; H04W 76/023; H04W 60/005;
(Continued)

(56) References Cited

U.S. PATENT DOCUMENTS

2012/0287854 A1* 11/2012 Xie ........................ H04W 48/08
370/328
2014/0016614 A1*  1/2014 Velev .................... H04W 4/005
370/331

FOREIGN PATENT DOCUMENTS

CN    101860807 A    10/2010
CN    102045897 A    5/2011
(Continued)

OTHER PUBLICATIONS

Supplementary European Search Report dated Oct. 15, 2015 in European Patent Application No. EP13807606.2.

*Primary Examiner* — Jackie Zuniga Abad
(74) *Attorney, Agent, or Firm* — Plumsea Law Group, LLC

(57) ABSTRACT

A mobility management method and system in an M2M network are provided. The method comprises: after an M2M terminal/terminal peripheral has registered to an M2M communication network through a mobility management unit, if the M2M terminal/terminal peripheral switches to an M2M stub network, an M2M gateway acquiring information of the M2M terminal/terminal peripheral from the mobility management unit.

14 Claims, 2 Drawing Sheets

(51) Int. Cl.
*H04W 8/02* (2009.01)
*H04W 8/20* (2009.01)
*H04W 12/06* (2009.01)
*H04W 48/18* (2009.01)
*H04W 60/00* (2009.01)
*H04W 60/06* (2009.01)
*H04W 76/02* (2009.01)
*H04W 76/06* (2009.01)
*H04W 84/04* (2009.01)
*H04W 88/06* (2009.01)

(52) U.S. Cl.
CPC ......... *H04W 12/06* (2013.01); *H04W 48/18* (2013.01); *H04W 60/005* (2013.01); *H04W 60/06* (2013.01); *H04W 76/023* (2013.01); *H04W 76/06* (2013.01); *H04W 84/04* (2013.01); *H04W 88/06* (2013.01)

(58) Field of Classification Search
CPC ....... H04W 48/18; H04W 12/06; H04W 8/20; H04W 8/02; H04W 8/10; H04W 88/06
See application file for complete search history.

(56) References Cited

FOREIGN PATENT DOCUMENTS

| | | |
|---|---|---|
| CN | 102244855 A1 | 11/2011 |
| CN | 102595373 A | 7/2012 |
| EP | 2523505 A1 | 11/2012 |
| WO | 2011101032 A1 | 8/2011 |
| WO | 2012127440 A1 | 9/2012 |

* cited by examiner

MOBILITY MANAGEMENT METHOD AND SYSTEM IN M2M NETWORK

CROSS-REFERENCE TO RELATED APPLICATION(S)

This application is the U.S. National Phase application of PCT application number PCT/CN2013/081572 having a PCT filing date of Aug. 15, 2013, which claims priority of Chinese patent application 201210498691.3 filed on Nov. 29, 2012, the disclosures of which are hereby incorporated by reference.

TECHNICAL FIELD

The present document relates to the M2M field, and in particular, to a mobility management method and system in an M2M network.

BACKGROUND

FIG. 1 is a structure diagram of an M2M system in the related art. The M2M system framework of the system shown in FIG. 1 is divided into an M2M application layer, an M2M service ability layer, a communication network layer, an M2M terminal and perception extension layer and a management support system.

The M2M terminal devices are divided into two kinds by the M2M terminal and perception extension layer according to the abilities of the M2M terminal devices: one is the M2M terminal with the capacity of communicating with the M2M communication network, wherein, the M2M terminal can access the M2M service platform through the communication network directly, can interact with the platform to complete the registration, authentication and authorization of the terminal, can provide the perception information required by the application to interact the service with the application through the M2M service platform, and can receive the management to the terminal peripheral. While another is the M2M gateway communicating with the M2M communication network and the M2M stub network, wherein, except accessing the M2M stub network into the M2M communication network, the M2M gateway can also receive the information of the M2M stub network node, and perform the protocol conversion between the M2M stub network and the M2M communication network. The terminal peripheral can only perform short distance communication because the limitation of itself, a single terminal of that type is called a terminal peripheral, and the network composed of multiple terminal nodes of that type is called the M2M stub network.

The mobility management unit (MME or SGSN) is an entity responsible for managing the access control, the location information update and switchover of the terminal device in the M2M communication network, and responsible for controlling the non-access layer signaling from the network to the terminal device and the function of registering the terminal device to the network.

The home subscriber server (HSS) or the home subscriber location register (HLR) is the entity responsible for storing the identity information the authentication information and the authorization information of the terminal device, etc., in the M2M communication network. The HSS or the HLR is used for storing the identity information of the user and the binding information of the user and the terminal device, and further responsible for managing the subscription database of the user and performing the identity authentication and authorization of the user, etc. The M2M service platform can inquire the HSS or the HLR for the information of the user or the terminal device.

In real application, the scene of the inter-conversion between the M2M terminal and the terminal peripheral will usually appear. For example, when the user accesses the personal terminal, such as, the mobile phone, the notebook computer / the tablet computer, etc., to the communication network through the home gateway, the vehicle-mounted gateway, the ship-borne gateway, etc., the personal terminal acts as the terminal peripheral and interacts with the service platform through the gateway; after the user leaves the stub network covered by the home gateway, the vehicle-mounted gateway, the ship-borne gateway, etc., the personal terminal acts as the M2M terminal and interacts with the service platform independently if the personal terminal is accessed directly into the communication network.

However, in the related art, there is no effective mechanism for the network to perform the mobility management to the M2M terminal/the terminal peripheral during the inter-conversion.

SUMMARY

The embodiment of the present document provides a mobility management method and system in an M2M network, to solve the technical problem how to perform effective mobility management to the M2M terminal / terminal peripheral when the switchover between the M2M communication network and the M2M stub network is performed.

In order to solve the above-mentioned technical problem, the embodiment of the present document provides the following technical scheme.

A mobility management method in an M2M network comprises:

after an M2M terminal/terminal peripheral has registered to an M2M communication network through a mobility management unit, if the M2M terminal/terminal peripheral switches to an M2M stub network, an M2M gateway acquiring information of the M2M terminal/terminal peripheral from the mobility management unit.

Alternatively, the method further has the following characteristics: the step of the M2M gateway acquiring information of the M2M terminal/terminal peripheral from the mobility management unit comprises:

the M2M gateway receiving an attachment request sent by the M2M terminal/terminal peripheral, wherein, the attachment request comprises a terminal device identity;

requesting the mobility management unit for subscription data of the M2M terminal/terminal peripheral, wherein, the request information comprises the terminal device identity; and receiving the subscription data of the M2M terminal/terminal peripheral sent by the mobility management unit.

Alternatively, the method further has the following characteristics: receiving the subscription data of the M2M terminal/terminal peripheral sent by the mobility management unit refers to: receiving the subscription data from a subscription data response message sent by the mobility management unit.

Alternatively, the method further has the following characteristics: the step of the M2M gateway acquiring information of the M2M terminal/terminal peripheral from the mobility management unit is executed after an authentication to the terminal device identity and a security certificate is completed.

Alternatively, the method further has the following characteristics: the method further comprises:

when the M2M terminal/terminal peripheral switches to the M2M stub network, the mobility management unit receiving a detachment request message sent by the M2M terminal/terminal peripheral, wherein, the detachment request message comprises the terminal device identity; and the mobility management unit deleting a bearer of the terminal/terminal peripheral in the M2M communication network for the M2M terminal/terminal peripheral according to the terminal device identity, and sending a detachment acceptance message to the M2M terminal/terminal peripheral.

A mobility management method in an M2M network comprises:

after an M2M terminal/terminal peripheral has registered to an M2M stub network through an M2M gateway, if the M2M terminal/terminal peripheral switches to the M2M communication network, then a mobility management unit acquiring information of the M2M terminal/terminal peripheral from the M2M gateway.

Alternatively, the method further has the following characteristics: the step of the mobility management unit acquiring information of the M2M terminal/terminal peripheral from the M2M gateway comprises:

the mobility management unit receiving an attachment request sent by the M2M terminal/terminal peripheral, wherein, the attachment request comprises a terminal device identity;

requesting the M2M gateway for subscription data of the M2M terminal/terminal peripheral, wherein, the request information comprises the terminal device identity; and receiving the information of the M2M terminal/terminal peripheral sent by the M2M gateway.

Alternatively, the method further has the following characteristics: receiving the information of the M2M terminal/terminal peripheral sent by the M2M gateway refers to: receiving the subscription data from a subscription data response message sent by the M2M gateway.

Alternatively, the method further has the following characteristics: the step of the mobility management unit acquiring information of the M2M terminal/terminal peripheral from the M2M gateway is executed after an authentication to the terminal device identity and a security certificate is completed.

Alternatively, the method further has the following characteristics: the method further comprises:

when the M2M terminal/terminal peripheral switches to the M2M terminal peripheral, the M2M gateway receiving a detachment request message sent by the M2M terminal/terminal peripheral, wherein, the detachment request message comprises the terminal device identity; and the M2M gateway deleting a router in the M2M stub network for the M2M terminal/terminal peripheral according to the terminal device identity, and sending a detachment acceptance message to the M2M terminal/terminal peripheral.

A mobility management system in an M2M network comprises an M2M gateway and a mobility management unit, wherein:

the M2M gateway is configured to: after an M2M terminal/terminal peripheral has registered to an M2M communication network through the mobility management unit, if the M2M terminal/terminal peripheral switches to an M2M stub network, acquire information of the M2M terminal/terminal peripheral from the mobility management unit.

Alternatively, the system further has the following characteristics: the M2M gateway comprises:

a first receiving module, configured to: receive an attachment request sent by the M2M terminal/terminal peripheral, wherein, the attachment request comprises a terminal device identity;

a first sending module, connected with the first receiving module, and configured to: request the mobility management unit for subscription data of the M2M terminal/terminal peripheral, wherein, the request information comprises the terminal device identity; and a second receiving module, configured to: receive the subscription data of the M2M terminal/terminal peripheral sent by the mobility management unit.

Alternatively, the system further has the following characteristics: the second receiving module receives the subscription data from a subscription data response message sent by the mobility management unit.

Alternatively, the system further has the following characteristics: the M2M gateway acquiring information of the M2M terminal/terminal peripheral from the mobility management unit is executed after an authentication to the terminal device identity and a security certificate is completed.

Alternatively, the system further has the following characteristics: the mobility management unit comprises:

a third receiving module, configured to: when the M2M terminal/terminal peripheral switches to the M2M stub network, receive a detachment request message sent by the M2M terminal/terminal peripheral, wherein, the detachment request message comprises the terminal device identity; and a processing module, connected with the third receiving module and configured to: delete a bearer of the terminal/terminal peripheral in the M2M communication network for the M2M terminal/terminal peripheral according to the terminal device identity; and a second sending module, connected with the processing module and configured to: send a detachment acceptance message to the M2M terminal/terminal peripheral.

A mobility management system in an M2M network comprises an M2M gateway and a mobility management unit, wherein:

the mobility management unit is configured to: after an M2M terminal/terminal peripheral has registered to an M2M stub network through the M2M gateway, if the M2M terminal/terminal peripheral switches to the M2M communication network, then acquire information of the M2M terminal/terminal peripheral from the M2M gateway.

Alternatively, the system further has the following characteristics: the mobility management unit comprises:

a first receiving module, configured to: receive an attachment request sent by the M2M terminal/terminal peripheral, wherein, the attachment request comprises a terminal device identity;

a first sending module, connected with the first receiving module and configured to: request the M2M gateway for subscription data of the M2M terminal/terminal peripheral, wherein, the request information comprises the terminal device identity; and a second receiving module, configured to: receive subscription data of the M2M terminal/terminal peripheral sent by the M2M gateway.

Alternatively, the system further has the following characteristics: the second receiving module receives the subscription data from a subscription data response message sent by the M2M gateway.

Alternatively, the system further has the following characteristics: the mobility management unit acquiring information of the M2M terminal/terminal peripheral from the M2M gateway is executed after an authentication to the terminal device identity and a security certificate is completed.

Alternatively, the system further has the following characteristics: the M2M gateway comprises:

a third receiving module, configured to: when the M2M terminal/terminal peripheral switches to the M2M terminal peripheral, receive a detachment request message sent by the M2M terminal/terminal peripheral, wherein, the detachment request message comprises the terminal device identity; and a processing module, connected with the third receiving module and configured to: delete a router in the M2M stub network for the M2M terminal/terminal peripheral according to the terminal device identity; and a second sending module, connected with the processing module and configured to: send a detachment acceptance message to the M2M terminal/terminal peripheral.

In the embodiment of the present document, while it is performed to switch between the M2M communication network and the M2stub network, the mobility management entity in the M2M communication network performs the mobility management to the M2M terminal / terminal peripheral through the M2M gateway, thus simplifying the network switchover procedure and improving the user experience.

PREFERRED EMBODIMENTS OF THE PRESENT DOCUMENT

The embodiment of the present document is described in detail with reference to the accompanying drawings hereinafter. It should be illustrated that, in the case of not conflicting, the embodiments in the present application and features in these embodiments can be combined with each other.

The embodiment of the present document provides a mobility management method in an M2M network, including:

after an M2M terminal/terminal peripheral has registered to an M2M communication network through a mobility management unit, if the M2M terminal/terminal peripheral switches to an M2M stub network, an M2M gateway acquiring subscription data of the M2M terminal/terminal peripheral from the mobility management unit.

Wherein, the M2M gateway acquiring the information of the M2M terminal/terminal peripheral from the mobility management unit includes the following steps.

In step A1, the M2M gateway receives an attachment request sent by the M2M terminal/terminal peripheral.

Wherein, the terminal device identity can be a globally unique temporary identity (GUTI).

In step A2, the M2M gateway sends the subscription data request message to the MME to request the subscription data of the M2M terminal/terminal peripheral, wherein, the request information includes the terminal device identity.

In step A3, the M2M gateway receives the subscription data of the M2M terminal/terminal peripheral sent by the mobility management unit.

Wherein, the subscription data can be carried by the self-defined message, and also can be carried by the already defined message in the protocol, such as, the subscription data response message.

Wherein, the M2M gateway acquiring the information of the M2M terminal/terminal peripheral from the mobility management unit is executed after an authentication to the terminal device identity and a security certificate is completed. There are the following advantages by doing like this, because the authentication operation not only can acquire the terminal device identity of the M2M terminal/terminal peripheral and thus being easy for follow-up acquiring the subscription data from the mobility management unit, but also avoiding the situation that it is detected that the authentication is failed and it is caused to be unable to access the network after acquiring the subscription data, which makes the acquired subscription data be useless.

The above-mentioned procedures are illustrated in detail hereinafter.

Embodiment One

Figure 1:
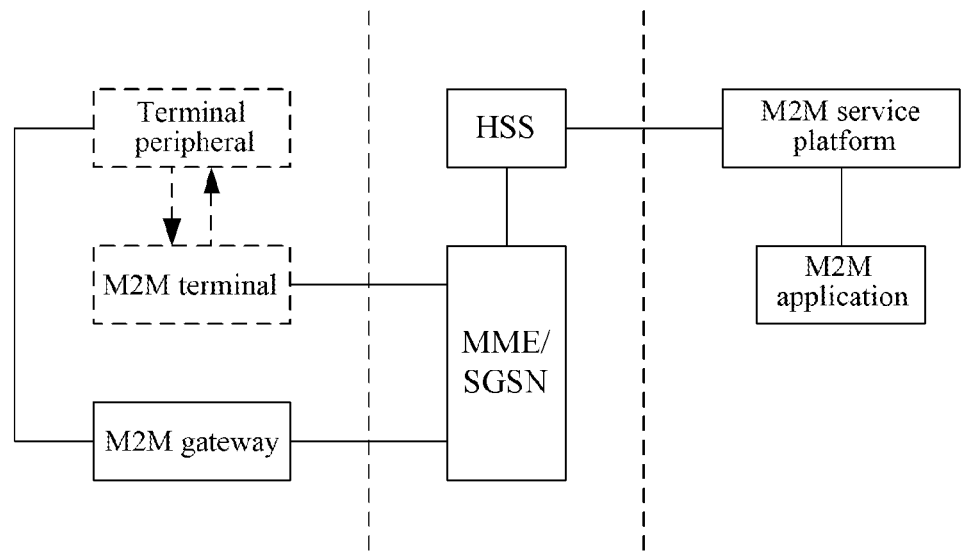
FIG. 1 is a structure diagram of an M2M system in the related art.
Figure 2:
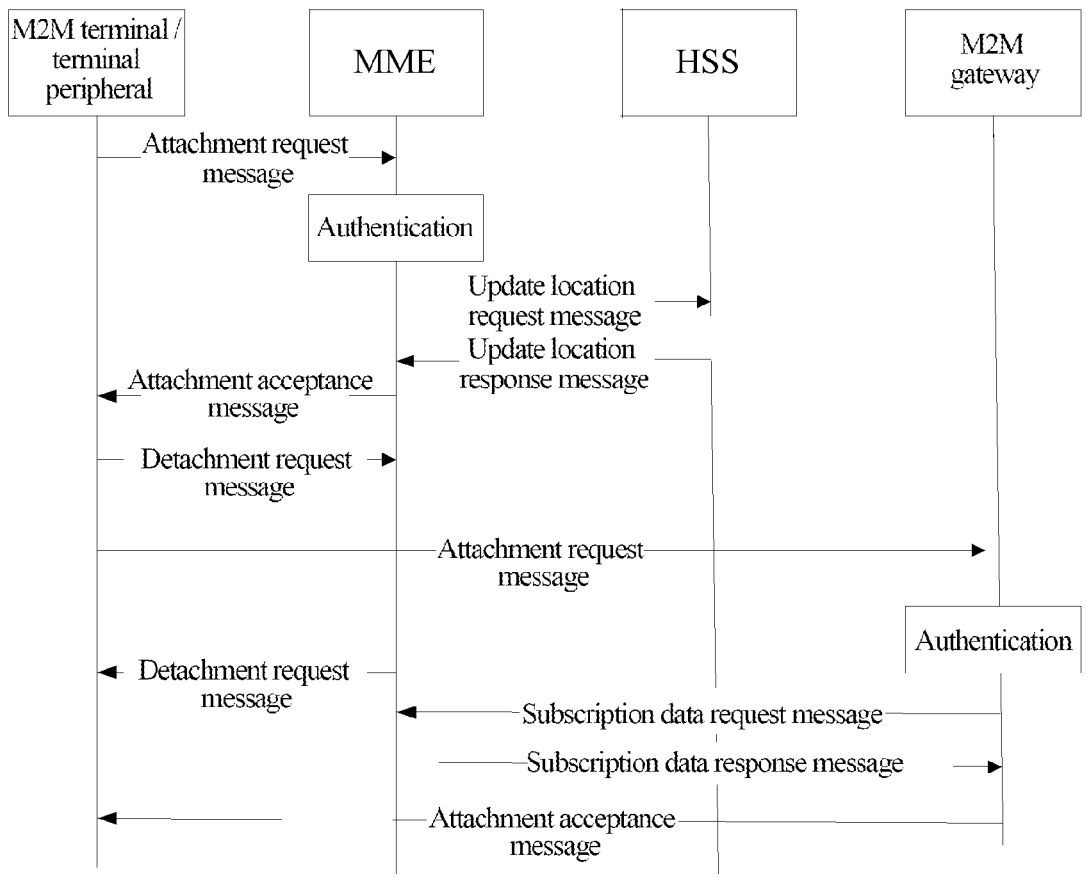
FIG. 2 is an interaction diagram of an application example of a mobility management method in an M2M network provided by an embodiment of the present document.

FIG. 2 is an interaction diagram of an application example of a mobility management method in an M2M network provided by an embodiment of the present document. The method illustrated in FIG. 2 includes steps 201 to 208.

In step 201, when the M2M terminal/terminal peripheral selects to register to the M2M communication network, the attachment request message is sent to the mobility management entity (MME), and the attachment request message includes the terminal device identity and the security certificate.

In step 202, after the MME passes the authentication to the terminal device identity and the security certificate, it requests the home subscriber server (HSS) for the subscription data of the M2M terminal/terminal peripheral through the update location request message, and the update location request message includes the terminal device identity, such as, the international mobile subscriber identity (IMSI), and the MME identity, such as, the globally unique MME identity (GUMMEI).

In step 203, after receiving the request of the MME, the HSS searches for the subscriber information corresponding to the M2M terminal/terminal peripheral according to the terminal device identity, and provides the subscription data of the M2M terminal/terminal peripheral to the MME through the update location response message.

In step 204, after receiving the subscription data sent by the HSS, the MME establishes a default bearer for the M2M terminal/terminal peripheral, and sends the attachment acceptance message to the M2M terminal/terminal peripheral, and the attachment acceptance message includes the terminal device identity, such as the globally unique temporary identity (GUTI).

In step 205, when the M2M terminal/terminal peripheral selects to switch to the M2M stub network, the detachment request message is sent to the MME, and the attachment request message includes the terminal device identity.

At the same time, the M2M terminal/terminal peripheral sends the attachment request message to the M2M gateway, and the attachment request message includes the terminal device identity and the security certificate, and the MME identity.

In step 206, after receiving the request of the M2M terminal/terminal peripheral, the MME deletes the bearer for the M2M terminal/terminal peripheral, and sends the detachment acceptance message to the M2M terminal/terminal peripheral.

On the other hand, after the M2M gateway passes the authentication to the terminal device identity and the security certificate, it requests the MME for the subscription data of the M2M terminal/terminal peripheral through the subscription data request message, and the subscription data request message includes the terminal device identity.

In step 207, after receiving the request of the M2M gateway, the MME searches for the subscriber information corresponding to the M2M terminal/terminal peripheral according to the terminal device identity, and provides the subscription data of the M2M terminal/terminal peripheral to the M2M gateway through the subscription data response message.

In step 208, after receiving the subscription data sent by the MME, the M2M gateway distributes the route for the M2M terminal/terminal peripheral, and sends the attachment acceptance message to the M2M terminal/terminal peripheral.

In addition, the embodiment of the present document provides a mobility management method in an M2M network, including:

after an M2M terminal/terminal peripheral has registered to an M2M stub network through an M2M gateway, if the M2M terminal/terminal peripheral switches to an M2M communication network, a mobility management unit acquiring subscription data of the M2M terminal/terminal peripheral from the M2M gateway.

Wherein, the mobility management unit acquiring the information of the M2M terminal/terminal peripheral from the mobility management unit includes the following steps.

In step A1, the mobility management unit receives an attachment request sent by the M2M terminal/terminal peripheral. Wherein, the terminal device identity can be a globally unique temporary identity (GUTI).

In step A2, it sends the subscription data request message to the M2M gateway to request the subscription data of the M2M terminal/terminal peripheral, wherein, the request information includes the terminal device identity.

In step A3, it receives the subscription data of the M2M terminal/terminal peripheral sent by the M2M gateway.

Wherein, the subscription data is carried by the subscription data response message.

Wherein, the mobility management acquiring the information of the M2M terminal/terminal peripheral from the M2M gateway unit is executed after an authentication to the terminal device identity and a security certificate is completed.

The above-mentioned procedures are illustrated in detail hereinafter.

Embodiment two (the terminal peripheral->the terminal)

Figure 3:
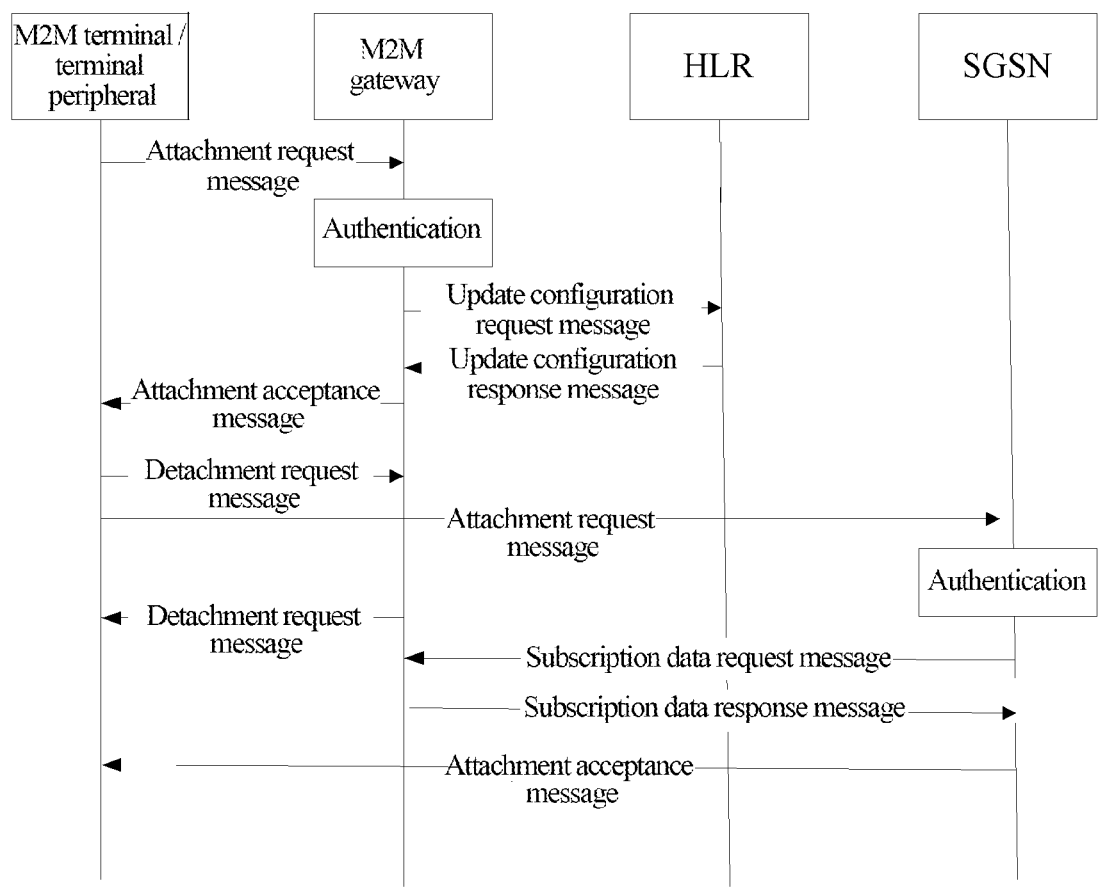
FIG. 3 is an interaction diagram of an application example of a mobility management method in an M2M network provided by an embodiment of the present document.

FIG. 3 is an interaction diagram of an application example of a mobility management method in an M2M network provided by an embodiment of the present document. The method illustrated in FIG. 3 includes steps 301 to 308.

In step 301, when the M2M terminal/terminal peripheral selects to register to the M2M stub network, the attachment request message is sent to the M2M gateway, and the attachment request message includes the terminal device identity and the security certificate.

In step 302, after the M2M gateway passes the authentication to the terminal device identity and the security certificate, it requests the home subscriber location register (HLR) for the subscription data of the M2M terminal/terminal peripheral through the update configuration request message, and the update configuration request message includes the terminal device identity, such as, the international mobile subscriber identity (IMSI).

In step 303, after receiving the update configuration request of the M2M gateway, the HLR searches for the subscriber information corresponding to the M2M terminal/terminal peripheral according to the terminal device identity, and provides the subscription data of the M2M terminal/terminal peripheral to the M2M gateway through the update configuration response message.

In step 304, after receiving the subscription data sent by the HLR, the M2M gateway distributes the route for the M2M terminal/terminal peripheral, and sends the attachment acceptance message to the M2M terminal/terminal peripheral, and the attachment acceptance message includes the terminal device identity, such as the area unique temporary identity (AUTI).

It should be illustrated that the AUTI is composed of two parts, the terminal device identity, such as, the temporary terminal peripheral identity (temporary peripheral device identity, TPDI), and the M2M gateway identity, such as, the globally unique gateway identity (GUGI).

In step 305, when the M2M terminal/terminal peripheral selects to switch to the M2M communication network, the detachment request message is sent to the M2M gateway, and the attachment request message includes the terminal device identity.

At the same time, the M2M terminal/terminal peripheral sends the attachment request message to the serving GPRS support node (SGSN), and the attachment request message includes the terminal device identity and the security certificate, and the M2M gateway identity.

In step 306, after receiving the attachment request of the M2M terminal/terminal peripheral, the M2M gateway deletes the route for the M2M terminal/terminal peripheral, and sends the detachment acceptance message to the M2M terminal/terminal peripheral.

On the other hand, after the SGSN passes the authentication to the terminal device identity and the security certificate, it requests the M2M gateway for the subscription data of the M2M terminal/terminal peripheral through the subscription data request message, and the subscription data request message includes the terminal device identity.

In step 307, after receiving the request of the SGSN, the M2M gateway searches for the subscriber information corresponding to the M2M terminal/terminal peripheral according to the terminal device identity, and provides the subscription data of the M2M terminal/terminal peripheral to the SGSN through the subscription data response message.

In step 308, after receiving the subscription data sent by the M2M gateway, the SGSN establishes the default bearer for the M2M terminal/terminal peripheral, and sends the attachment acceptance message to the M2M terminal/terminal peripheral. The attachment acceptance message includes the terminal device identity, such as, the package Temporary Mobile Subscriber Identity (P-TMSI).

It can be seen from the above that, in the embodiment of the present document, while it is performed to switch between the M2M communication network and the M2 stub network, the mobility management entity in the M2M communication network performs the mobility management to the M2M terminal / terminal peripheral through the M2M gateway, thus simplifying the network switchover procedure and improving the user experience.

In addition, the embodiment of the present document provides a mobility management system in an M2M network, including an M2M gateway and a mobility management unit, wherein:

the M2M gateway is configured to: after an M2M terminal/terminal peripheral has registered to an M2M communication network through the mobility management unit, if the M2M terminal/terminal peripheral switches to an M2M stub network, acquire information of the M2M terminal/terminal peripheral from the mobility management unit.

Wherein, the M2M gateway includes:

a first receiving module, configured to: receive an attachment request sent by the M2M terminal/terminal peripheral, wherein, the attachment request comprises a terminal device identity;

a first sending module, connected with the first receiving module, and configured to: send a subscription data request message to the mobility management unit to request for the subscription data of the M2M terminal/terminal peripheral, wherein, the subscription data request information includes the terminal device identity; and a second receiving module, configured to: receive the subscription data of the M2M terminal/terminal peripheral sent by the mobility management unit.

Wherein, the subscription data are carried by the subscription data response message.

Wherein, the M2M gateway acquiring the information of the M2M terminal/terminal peripheral from the mobility management unit is executed after an authentication to the terminal device identity and a security certificate is completed.

Wherein, the mobility management unit includes:

a third receiving module, configured to: when the M2M terminal/terminal peripheral switches to the M2M stub network, receive a detachment request message sent by the M2M terminal/terminal peripheral, wherein, the detachment request message comprises the terminal device identity; and a processing module, connected with the third receiving module and configured to: delete a bearer of the terminal/terminal peripheral in the M2M communication network for the M2M terminal/terminal peripheral according to the terminal device identity; and a second sending module, connected with the processing module and configured to: send a detachment acceptance message to the M2M terminal/terminal peripheral.

In the system embodiment provided by the present application, while it is performed to switch between the M2M communication network and the M2 stub network, the mobility management entity in the M2M communication network performs the mobility management to the M2M terminal/terminal peripheral through the M2M gateway, thus simplifying the network switchover procedure and improving the user experience.

A mobility management system in an M2M network includes an M2M gateway and a mobility management unit, wherein:

the mobility management unit is configured to: after an M2M terminal/terminal peripheral has registered to an M2M stub network through the M2M gateway, if the M2M terminal/terminal peripheral switches to the M2M communication network, then acquire information of the M2M terminal/terminal peripheral from the M2M gateway.

Wherein, the mobility management unit includes:

a first receiving module, configured to: receive an attachment request sent by the M2M terminal/terminal peripheral, wherein, the attachment request comprises a terminal device identity;

a first sending module, connected with the first receiving module and configured to: request the M2M gateway for subscription data of the M2M terminal/terminal peripheral, wherein, the request information comprises the terminal device identity; and a second receiving module, configured to: receive subscription data of the M2M terminal/terminal peripheral sent by the M2M gateway.

Wherein, the subscription data are carried by the subscription data response message.

Wherein, the mobility management unit acquiring information of the M2M terminal/terminal peripheral from the M2M gateway is executed after an authentication to the terminal device identity and a security certificate is completed.

Wherein, the M2M gateway comprises:

a third receiving module, configured to: when the M2M terminal/terminal peripheral switches to the M2M terminal peripheral, receive a detachment request message sent by the M2M terminal/terminal peripheral, wherein, the detachment request message comprises the terminal device identity; and a processing module, connected with the third receiving module and configured to: delete a router in the M2M stub network for the M2M terminal/terminal peripheral according to the terminal device identity; and a second sending module, connected with the processing module and configured to: send a detachment acceptance message to the M2M terminal/terminal peripheral.

In the system embodiment provided by the present application, while it is performed to switch between the M2M communication network and the M2 stub network, the mobility management entity in the M2M communication network performs the mobility management to the M2M terminal/terminal peripheral through the M2M gateway, thus simplifying the network switchover procedure and improving the user experience.

INDUSTRIAL APPLICABILITY

In the embodiment of the present document, while it is performed to switch between the M2M communication network and the M2 stub network, the mobility management entity in the M2M communication network performs the mobility management to the M2M terminal / terminal peripheral through the M2M gateway, thus simplifying the network switchover procedure and improving the user experience.

What I claim is:

1. A mobility management method in a machine to machine (M2M) network, comprising:

after a machine to machine (M2M) terminal/terminal peripheral has registered to an machine to machine (M2M) communication network through a mobility management unit, when the machine to machine (M2M) terminal/terminal peripheral switches from the machine to machine (M2M) communication network to a machine to machine (M2M) stub network, an a machine to machine (M2M) gateway acquiring information of the machine to machine (M2M) terminal/terminal peripheral from the mobility management unit; wherein the method further comprising:

when the M2M terminal/terminal peripheral switches from the machine to machine (M2M) communication network to the machine to machine (M2M) stub network, the mobility management unit receiving a detachment request message sent by the machine to machine (M2M) terminal/terminal peripheral, wherein, the detachment request message comprises a terminal device identity; and the mobility management unit deleting a bearer of the terminal/terminal peripheral in the machine to machine (M2M) communication network for the machine to machine (M2M) terminal/terminal peripheral according to the terminal device identity, and sending a detachment acceptance message to the machine to machine (M2M) terminal/terminal peripheral; wherein, the method further comprising, when the M2M terminal/terminal peripheral switches from the machine to machine (M2M) communication network to the machine to machine (M2M) stub network, the M2M terminal/terminal peripheral sending an attachment request message to the M2M gateway, wherein the attachment request message comprises the terminal device identity and a security certificate, and a mobility management entity (MME) identity, the M2M gateway distributing a routing sending the attachment acceptance message to the M2M terminal/terminal peripheral.

2. The method according to claim 1, wherein, the step of the machine to machine (M2M) gateway acquiring information of the machine to machine (M2M) terminal/terminal peripheral from the mobility management unit comprises:

the machine to machine (M2M) gateway receiving an attachment request sent by the machine to machine (M2M) terminal/terminal peripheral, wherein, the attachment request comprises a terminal device identity;

requesting the mobility management unit for subscription data of the machine to machine (M2M) terminal/terminal peripheral, wherein, the request data comprises the terminal device identity; and receiving the subscription data of the machine to machine (M2M) terminal/terminal peripheral sent by the mobility management unit.

3. The method according to claim 2, wherein, receiving the subscription data of the machine to machine (M2M) terminal/terminal peripheral sent by the mobility management unit refers to:

receiving the subscription data from a subscription data response message sent by the mobility management unit.

4. The method according to claim 1, wherein, the step of the machine to machine (M2M) gateway acquiring information of the machine to machine (M2M) terminal/terminal peripheral from the mobility management unit is executed after an authentication to the terminal device identity and a security certificate is completed.

5. A mobility management method in a machine to machine (M2M) network, comprising:

after a machine to machine (M2M) terminal/terminal peripheral has registered to a machine to machine (M2M) stub network through a machine to machine (M2M) gateway, when the machine to machine (M2M) terminal/terminal peripheral switches from the machine to machine (M2M) stub network to a machine to machine (M2M) communication network, then a mobility management unit acquiring information of the machine to machine (M2M) terminal/terminal peripheral from the machine to machine (M2M) gateway; wherein the method further comprising:

when the machine to machine (M2M) terminal/terminal peripheral switches from the machine to machine (M2M) stub network to the machine to machine (M2M) communication network, the machine to machine (M2M) gateway receiving a detachment request message sent by the machine to machine (M2M) terminal/terminal peripheral, wherein, the detachment request message comprises a terminal device identity; and the machine to machine (M2M) gateway deleting a router in the machine to machine (M2M) stub network for the machine to machine (M2M) terminal/terminal peripheral according to the terminal device identity, and sending a detachment acceptance message to the machine to machine (M2M) terminal/terminal peripheral; wherein the method further comprising:

when the machine to machine (M2M) terminal/terminal peripheral switches from the machine to machine (M2M) stub network to the machine to machine (M2M) communication network, the M2M terminal/terminal peripheral sending an attachment request message to a serving GPRS support node (SGSN), wherein, the attachment request message includes the terminal device identity and a security certificate, and a M2M gateway identity;

the serving GPRS support node (SGSN) establishing a default bearer for the M2M terminal/terminal peripheral, and sending the attachment acceptance message to the M2M terminal/terminal peripheral.

6. The method according to claim 5, wherein, the step of the mobility management unit acquiring information of the machine to machine (M2M) terminal/terminal peripheral from the machine to machine (M2M) gateway comprises:

the mobility management unit receiving an attachment request sent by the machine to machine (M2M) terminal/terminal peripheral, wherein, the attachment request comprises a terminal device identity;

requesting the machine to machine (M2M) gateway for subscription data of the machine to machine (M2M) terminal/terminal peripheral, wherein, the request data comprises the terminal device identity; and receiving the information of the machine to machine (M2M) terminal/terminal peripheral sent by the machine to machine (M2M) gateway.

7. The method according to claim 6, wherein, receiving the information of the machine to machine (M2M) terminal/terminal peripheral sent by the machine to machine (M2M) gateway refers to:

receiving the subscription data from a subscription data response message sent by the machine to machine (M2M) gateway.

8. The method according to claim 5, wherein, the step of the mobility management unit acquiring information of the machine to machine (M2M) terminal/terminal peripheral from the machine to machine (M2M) gateway is executed after an authentication to the terminal device identity and a security certificate is completed.

9. A mobility management system in a machine to machine (M2M) network, comprising a machine to machine (M2M) gateway and a mobility management unit, wherein:

the machine to machine (M2M) gateway comprises hardware processor performing following functions: after a machine to machine (M2M) terminal/terminal peripheral has registered to a machine to machine (M2M) communication network through the mobility management unit, when the machine to machine (M2M terminal/terminal peripheral switches from the machine to machine (M2M) communication network to a machine to machine (M2M) stub network, acquire information of the machine to machine (M2M) terminal/terminal peripheral from the mobility management unit;

wherein, the mobility management unit comprises hardware processor performing functions of the following modules:

a third receiving module, configured to: when the machine to machine (M2M) terminal/terminal peripheral switches from the machine to machine (M2M) communication network to the machine to machine (M2M) stub network, receive a detachment request message sent by the machine to machine (M2M) terminal/terminal peripheral, wherein, the detachment request message comprises a terminal device identity; and a processing module, connected with the third receiving module and configured to:

delete a bearer of the terminal/terminal peripheral in the machine to machine (M2M) communication network for the machine to machine (M2M) terminal/terminal peripheral according to the terminal device identity; and a second sending module, connected with the processing module and configured to:

send a detachment acceptance message to the machine to machine (M2M) terminal/terminal peripheral; wherein, the machine to machine (M2M) gateway comprises hardware processor performing functions of the following modules:

a first receiving module, configured to: when the machine to machine (M2M) terminal/terminal peripheral switches from the machine to machine (M2M) communication network to the machine to machine (M2M) stub network, receive an attachment request sent by the machine to machine (M2M) terminal/terminal peripheral, wherein, the attachment request comprises a terminal device identity;

a first sending module, connected with the first receiving module, and configured to:

request the mobility management unit for subscription data of the machine to machine (M2M) terminal/terminal peripheral, wherein, the request data comprises the terminal device identity; and a second receiving module, configured to: receive the subscription data of the machine to machine (M2M) terminal/terminal peripheral sent by the mobility management unit.

10. The system according to claim 9, wherein, the second receiving module receives the subscription data from a subscription data response message sent by the mobility management unit.

11. The system according to claim 9, wherein, the machine to machine (M2M) gateway acquiring information of the machine to machine (M2M) terminal/terminal peripheral from the mobility management unit is executed after an authentication to the terminal device identity and a security certificate is completed.

12. A mobility management system in a machine to machine (M2M) network, comprising a machine to machine (M2M) gateway and a mobility management unit, wherein:

the mobility management unit comprises hardware processor performing following functions: after a machine to machine (M2M) terminal / terminal peripheral has registered to a machine to machine (M2M) stub network through the machine to machine (M2M) gateway, when the machine to machine (M2M) terminal / terminal peripheral switches from the machine to machine (M2M) stub network to the machine to machine (M2M) communication network, then acquire information of the machine to machine (M2M) terminal / terminal peripheral from the machine to machine (M2M) gateway;

wherein, the machine to machine (M2M) gateway comprises hardware processor performing functions of the following modules:

a third receiving module, configured to: when the machine to machine (M2M) terminal/terminal peripheral switches from the stub network to the machine to machine (M2M) communication network, receive a detachment request message sent by the machine to machine (M2M) terminal/terminal peripheral, wherein, the detachment request message comprises a terminal device identity; and a processing module, connected with the third receiving module and configured to: delete a router in the machine to machine (M2M) stub network for the machine to machine (M2M) terminal/terminal peripheral according to the terminal device identity; and a second sending module, connected with the processing module and configured to: send a detachment acceptance message to the machine to machine (M2M) terminal/terminal peripheral; wherein, the mobility management unit comprises hardware processor performing functions of the following modules:

a first receiving module, configured to: when the machine to machine (M2M) terminal/terminal peripheral switches from the stub network to the machine to machine (M2M) communication network, receive an attachment request sent by the machine to machine (M2M) terminal/terminal peripheral, wherein, the attachment request comprises a terminal device identity;

a first sending module, connected with the first receiving module and configured to: request the machine to machine (M2M) gateway for subscription data of the machine to machine (M2M) terminal/terminal peripheral, wherein, the request data comprises the terminal device identity; and a second receiving module, configured to: receive subscription data of the machine to machine (M2M) terminal/terminal peripheral sent by the machine to machine (M2M) gateway.

13. The system according to claim 12, wherein, the second receiving module receives the subscription data from a subscription data response message sent by the machine to machine (M2M) gateway.

14. The system according to claim 12, wherein, the mobility management unit acquiring information of the machine to machine (M2M) terminal/terminal peripheral from the machine to machine (M2M) gateway is executed after an authentication to the terminal device identity and a security certificate is completed.

* * * * *